OR 3,704,929 D

X 3054W

SEARCH ROOM

2

United States Patent [15] 3,704,929

Sakaguchi et al. SUBSTITUTE FOR MISSING OR [45] *Dec. 5, 1972

[54] LARGE CAPACITY ASSOCIATIVE MEMORY EMPLOYING HOLOGRAPHY

[72] Inventors: Mitsuhito Sakaguchi; Nobuo Nishida, both of Tokyo-to, Japan

[73] Assignee: Nippon Electric Company, Limited, Minato-ku, Japan

[ * ] Notice: The portion of the term of this patent subsequent to March 30, 1988, has been disclaimed.

[22] Filed: Nov. 12, 1970

[21] Appl. No.: 88,745

[30] Foreign Application Priority Data

Dec. 6, 1969 Japan ................................44/97996

[52] U.S. Cl...............................350/3.5, 340/173 LT

[51] Int. Cl............................................G02b 27/00

[58] Field of Search...350/3.5; 340/173 LT, 173 LM; 250/219 D, 219 DD

[56] References Cited

UNITED STATES PATENTS

| | | | |
|---|---|---|---|
| 3,572,881 | 3/1971 | Nishida et al | 350/3.5 |
| 3,296,594 | 1/1967 | Van Heerden | 350/3.5 |
| 3,600,054 | 8/1971 | Gabor | 350/3.5 |

OTHER PUBLICATIONS

Gabor, Nature, Vol. 208, No. 5009, Oct. 1965, pp. 422–423.

*Primary Examiner*—David Schonberg
*Assistant Examiner*—Ronald J. Stern
*Attorney*—Ostrolenk, Faber, Gerb and Soffen

[57] ABSTRACT

A large capacity associative memory of the holographic type. Coded information uniquely identifying first data and in the form of spatially modulated coherent light rays, forms an interference pattern with coded information representing second data in the form of spatially modulated coherent light rays and which are related to the first data in a predetermined fashion, as well as with a coherent light beam of relatively narrow cross-section whereby said interference pattern is recorded upon a record plate of photosensitive material in a direction transverse to the surface of the plate. Only that portion of the plate which is exposed to the small cross-section light beam develops the interference pattern, as a result of the use of a saturable die plate positioned in front of the photographic plate to prevent passage of light therethrough except at that area (or those areas) in which the coherent light exceeds a predetermined threshold value. The plate is filled with inter-related first and second data in a point-by-point basis by sequentially scanning the plate with the narrow cross-section beam.

Retrieval of data is brought about by directing spatially modulated coherent light beams, representative of the binary information upon the record plate. A first detector array identifies those positions on the record plate which fail to generate primary diffraction images. Using this information, the narrow cross-section coherent light beam is deflected to each of the positions storing a retrieved pattern. Second and third detector arrays detect light spots generated by Braggs reflection which spots respectively represent the interrogation information and the retrieval information related thereto.

9 Claims, 2 Drawing Figures

Figures 1, 2:
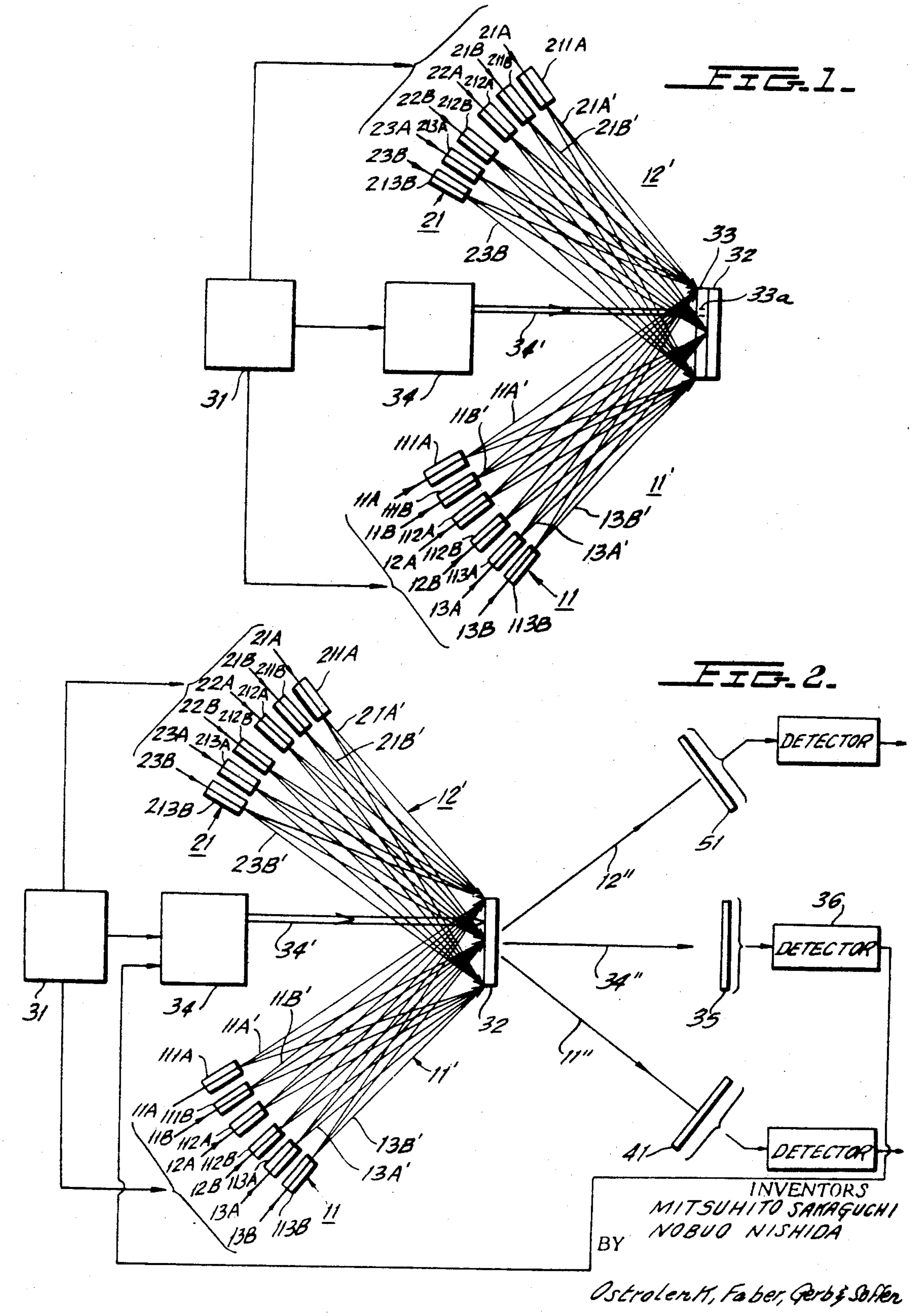

INVENTORS
MITSUHITO SAKAGUCHI
NOBUO NISHIDA
BY
Ostrolenk, Faber, Gerb & Soffen
ATTORNEYS

LARGE CAPACITY ASSOCIATIVE MEMORY EMPLOYING HOLOGRAPHY

The present invention relates to an associative information storage system and, more particularly, to a high-density, large capacity associative memory system of the volume hologram type wherein interference patterns are recorded in a photographic plate or other suitable recording medium in a direction transverse to the planar surface thereof.

The employment of associative memory systems has been proposed to facilitate information retrieval system for purposes such as data classification or work-to-word translation. A significant amount of research and development has been undertaken in an effort to reduce the associative memory to practical use and further research is still being performed.

In systems of this type, the contents of the stored data itself serves as a clue to provide access thereto without resorting to the address assigned to each group of the stored data. Among the conventional associative memory systems, there is one proposed by Bell Telephone Laboratories and published in Japan under Patent Publication No. 43-21900. This system employs magnetic thin film, cores, and other magnetic memories as the storage elements. Another proposed system by Ryo Igarashi set forth in an article published in the Proceedings of Spring Joint Computer Conference, 1967, p. 499 – 506 describes the use of MOS-type transistors. The disadvantage common to these conventional associative memories is that they are very costly to manufacture as well as having a rather limited storage capacity, principally because virtually double the number of memory elements are required to make the associative memory feasible. Stated more specifically with regard to the Bell Telephone Laboratories Memory Proposal, one bit of data stored in the "associative" fashion, requires core memory units in quantities which are twice to four times as great as the number of similar devices required in conventional non-associative memories. On the other hand, since information processing systems, such as data retrieval or word-to-word translation systems cannot be put into practical use until an associative memory of sufficiently high capacity is employed, the manufacturing cost per bit of the associative memory should be as low as possible.

In the copending U.S. Pat. application Ser. No. 812,069, filed on Apr. 1, 1969 now U.S. Pat. No. 3,614,191, issued Oct. 19, 1971, the present inventors proposed therein a novel associative memory system employing holography to satisfy the above mentioned requirements. Also, in another copending U.S. Pat. application Ser. No. 845,243 now U.S. Pat. No. 3,572,881 issued Mar. 30, 1971, the inventors proposed a large capacity associative memory employing volume holographic techniques. Since a detailed description of associative memory systems and of the application of holography thereto and further of the application of volume holography thereto is given in the specifications of the above mentioned copending applications, a further detailed description will not be given in this specification for the purpose of simplicity, the descriptions set forth in the above copending applications being incorporated herein by reference. In the latter case, one type of stored data is analog information such as microfilm. This makes only one-way retrieval possible. Therefore, it is not suitable for two-way information retrieval such as word-to-word translation.

It is therefore the object of this invention to provide an associative memory system employing volume holography, whose memory capacity is remarkably increased by a technique in which interference patterns are recorded.

Another object of the present invention is to provide a novel associative memory system of the volume holography type in which an interference pattern is formed by spatially modulated first and second coherent beam groups and a third coherent beam of small cross-section whereby the interference pattern contains information inter-relating said first and second data.

Still another object of the present invention is to provide a novel associative memory system of the volume holography type in which an interference pattern is formed by spatially modulated first and second coherent beam groups and a third coherent beam of small cross-section whereby the interference pattern contains information inter-relating said first and second data and wherein retrieval of said data may be obtained by exposing the plate containing the interference patterns to spatially modulated coherent light beams representative of either said first or said second data and providing detector means for identifying said first data and said second data.

The present invention relates to a method for storing and retrieving information in associative memory systems of the volume holography type which includes the steps of forming an interference pattern in said plate from first and second spatially modulated beam sources representing first and second inter-related data and retrieving the information by irradiating the plate containing the interference patterns with one of said spatially modulated beam groups whereby the patterns representing both said first and said second data are retrieved.

These as well as other objects of the present invention will become apparent when reading the accompanying description and drawings in which:

FIG. 1 is a schematic diagram of a principal portion of the present invention as is employed for storage of data; and FIG. 2 is a schematic diagram showing that part of the invention employed for data retrieval.

Referring to FIG. 1, the embodiment in its write-in phase includes a group 11 of coherent light sources 111A, 111B, . . . and 113B, which irradiate, respectively under the control of input parallel binary digital signals applied at inputs 11A, 11B, . . . and 13B, a group of scattered coherent light rays 11A', 11B', . . . and 13B', which illuminate a photographic plate having a photosensitive layer thick enough for volume hologram recording. Each bit of the input digital signals is accompanied by its complementary value, and a pair of coherent light sources are assigned to each bit. For example, a binary "1" of the first digit is represented by a state where signal "1" is applied at 11A while a signal "0" is applied at 11B, and "0" of the second digit is represented by signal "0" applied at input 12A while a signal "1" is applied at input 12B, the third digit being represented in a like manner. Each of the light sources 111A – 113B generates output coherent light rays when its input digital signal bit is "1." Thus, light beams 11A', 12B' and 13A' will be produced in response to an input digital code "101," while coherent light beams 11A', 12B' and 13B' will be produced in response to another input digital code "100." In brief, each bit of the input parallel digital signals is accompanied by a complementary bit and is directly converted into a corresponding combination of diffused coherent light beams 11A' – 13B'.

Similarly, the other group 21 of light sources 211A, 211B, . . . and 213B generate, under the selective on-off control of input parallel digital signals applied at inputs 21A, 21B, . . . and 23B, diffused coherent light beams 21A', 21B', . . . and 23B', representing the parallel digital signals of three bits each accompanied by its complement.

While each of the sets of digital signals 11A to 13B and 21A to 23B is shown here as consisting of three bits, this showing has been merely for the purpose of simplicity of illustration and the total number employed can include any desired number of bits. Although digital signals are applied to the light source groups 11 and 21 on a time-division basis, the time point, when these coherent light source groups receive the parallel digital signals are adjusted so as to surely coincide by any information processing unit 31.

When the associative memory is used for the translation between two languages, coded signals for a word in one language are supplied to the light source group 11 just at the same time as the corresponding translated word in the other language is supplied to the light source group 21, so that a pair of diffused coherent light beams groups 11' and 12', each representing information corresponding to the other , illuminate the record plate 32.

In front of and in parallel with the plate 32 is disposed a saturable dye plate 33. This plate 33 is of material which is opaque when illuminated by ambient light, but becomes transparent when illuminated by a light beam (or beams) exceeding a certain threshold value. Such material is described in "Ruby Laser Q-switching Elements Using Phthalocybnine Molecules in Solution" by P.P. Sorokin, IBM Journal, April 1964, p. 182, etc. and will not be described here for purposes of brevity.

In the embodiment shown in FIG. 1, the light beam groups 11' and 12' are so adjusted that their simultaneous irradiation is insufficient to exceed the certain threshold value. When a coherent and narrow-pointed light beam 34' from a light deflection device 34 illuminates a portion 33*a* of the plate 33, this illuminated portion becomes transparent, whereby the interference pattern of light beam groups 11' and 12' and the coherent light beam 34' is recorded on the plate 32 only in the small region of plate 32 which lies behind portion 33*a*. Since the record plate 32 is selected to be thick enough for volume holography, the record image is formed in a direction transverse to the record plate surface. As the address light beam 34' can be made thin enough in cross-sectional area, and moreover, as interference patterns are recorded in a direction which is non-parallel with the plate surface, a considerable high recording density can be attained. Thus, by way of control means 31 the illuminating position of the address light beam 34' is shifted as the combination of the coherent light beam groups 11' and 12' changes. This write-in operation is repeated till the surface of the photographic plate 32 is filled with record patterns to complete the hologram plate 32.

The retrieval stage will now be explained with reference to FIG. 2. According to the principle of the associative read-out, the entire surface of the record plate 32 is irradiated by retrieving light beams 11' consisting of each complementary bit of the interrogation signals, with the saturable dye plate 33 (shown in FIG. 1) removed. Any interference patterns containing at least one bit accordant with a bit of the retrieving light beams appear in the form of the first order diffraction components of the rays 12', 34' and 11' due to the Bragg's reflection, on the photodiode array plates 51, 35 and 41, as rays 12'', 34'' and 11'' respectively. On the diode array plate 35 appear as diffraction images all spots except the spots of the information to be retrieved. Utilizing the principle of associative retrieval it can be determined that the interference patterns of the retrieved information are located at those points on record plate 32 which correspond to the spots where no first order diffraction images appear on the diode array plate . These points are detected by a detector 36, and its output is fed back to the light deflection device 34. This fed-back signal causes the spots storing the retrieved patterns to be illuminated, thereby causing, through Bragg's reflection, the desired retrieved information to appear in the form of a train of light spots on the diode array plate 41. At the same time, the interrogation information corresponding to the retrieved information also appears as a train of light spots on the diode array plate 51.

A similar retrieval operation as described above is equally possible when the interrogation information is alternatively applied to the light source group 21. Therefore, this invention makes a two-way retrieval possible. For example, when the memory system is used for translation between English and Japanese, it can serve for either and/or both English-to-Japanese and Japanese-to-English translations.

For the embodiment described above, each of the light sources 111A – 113B and 211A – 213B may comprise a combination of a coherent light source, six polarization-plane rotating elements and six double-refraction prisms, as described in the copending applications mentioned above. The details of the photodiode array plates 51, 35 and 41 are also described in the copending applications and will not be described here in detail. They may comprise semiconductor IC's, the spacing between the diodes being determined in consideration of the bit-spacing of the interference patterns, distance to the photographic plate, etc. For the light deflection device 34, either a combination of a coherent light source, a polarization-plane rotating device and a birefringent prism, or a combination of a coherent light source and a deflection means using ultra-sonic standing waves may be employed. These deflection means are fully described in the PIEEE, vol. 54, No. 10 (October 1966), p. 1419 – 1437, etc., and will not be described here.

As will be understood from the foregoing description, this invention provides an associative memory of high storage density using volume holography, wherein two-way retrieval is possible.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A hologram associative memory incorporating photosensitive record means and comprising a first light modulating means for spatially modulating a first array of diffused coherent light beams in response to a first multi-bit binary parallel digital information signal to be stored, a second light modulating means for spatially modulating a second array of diffused coherent light beams in response to a second multi-bit binary parallel digital information signal to be stored and having a certain relation with said first information signal, each of said first and second arrays of beams consisting of pairs of beams, there being one pain of beams for each bit in said multi-bit signal, each of said modulating means being operative for each pair of beams to block one of said pair and to transmit the other of said pair depending on the information state of the bit associated with that pair of beams;

third means for generating a third signal coherent light beam of narrow cross-section and for deflecting said beam in accordance with an input signal to any one of a plurality of locations on said record means;

the illuminated beams of said first, second and third means being directed to intersect each other to form an interference pattern;

said photosensitive record means being a substantially planar thick photosensitive plate for photographically recording said interference pattern, said interference pattern being generated in the direction transverse to the surface of said record means;

means operable only during the recording operation for permitting the interference pattern to be recorded upon said record means only where said first and second beam arrays intersect with said third beam.

2. The system of claim 1 further comprising means for interrogating said memory with an interrogation signal comprising means for converting the interrogation signal into the binary complement of its associated information signal and applying the binary complement of said interrogation signal to one of said first or second means; first detector means positioned on the side of said record means opposite said light modulating means and being arranged to respectively detect those positions where no first order diffraction images of the third beam are present on said record means when said record means is illuminated by one of said first or second light modulating means;

means coupling said detector means to said third means for sequentially illuminating those positions where no first order diffraction images of said third beam are detected.

3. The system of claim 2 further comprising second detector means positioned to detect the information representative of the pattern generated by the modulating means which has not received the interrogation signal when said record means is illuminated at those positions having no first order diffraction images of said third beam.

4. The system of claim 3 comprising third detector means positioned to detect the information representative of the pattern generated by the modulating means receiving said interrogation signal when said record means is illuminated by said third beam at those positions having no first order diffraction images of said third beam when said record means is illuminated by said interrogation signal.

5. The system of claim 2 wherein said detector means is comprised of an array of photosensitive devices each arranged to detect light emanating from an associated position in said record means containing an interference pattern;

means coupled to said array for detecting those positions which fail to generate first order diffraction images of said third beam;

means coupled to said detector for operating said third means to illuminate those positions which fail to generate first order diffraction images of said third beam when said record means is illuminated by the interrogation signal.

6. The system of claim 4 wherein said first and second detector means are each comprised of an array of photosensitive devices each arranged to detect light emanating from an associated position in said record means containing an interference pattern.

7. A method for simultaneously storing a large quantity of first information groups and second information groups equal in quantity to said first information groups upon a thick photosensitive record plate wherein each of said first groups is related to an associated one of said second groups comprising the steps of:

spatially modulating a first coherent light source in a multi-bit binary digital manner to generate an array of pairs of beams representative of one of said first information groups there being one pair of beams for each binary bit wherein only one beam of each pair is transmitted while the other is blocked dependent upon the state of the binary digital signal associated with the pair of beams;

spatially modulating a second coherent light source in a multi-bit binary digital manner to generate an array of pairs of beams representative of one of said second information groups associated therewith there being one pair of beams for each binary bit wherein only one beam of each pair is transmitted while the other is blocked dependent upon the state of the binary digital signal associated with the pair of beams;

generating a single coherent beam of small cross-sectional and deflecting said single beam in a predetermined direction in accordance with an input signal to one of a plurality of locations on said photosensitive record plate;

the beams of said first and second sources intersecting with said narrow beam to form an interference pattern;

positioning the thick planar photosensitive record sheet to record said interference pattern;

preventing those portions of said interference pattern below a predetermined threshold level of light intensity from being recorded upon said sheet, said threshold level being chosen to prevent recording of those portions of the interference pattern not including said narrow beam, whereby the portions of the interference pattern having a total intensity above said threshold level are recorded in said plate in a direction transverse to the surface of said record sheet.

8. The method of claim 7 further comprising the step of sequentially directing the coherent light beam of small cross-section toward a new position on said plate and modulating said first and second sources with the next set of associated information signals for each new interference pattern.

9. A method for retrieving information from a plate containing interference patterns developed by the method of claim 7 with an interrogation word comprising the steps of:

spatially modulating a first coherent light beam in accordance with the interrogation information which is the complement of one group of either said first or second information and directly illuminating said plate thereby;

detecting those positions of said plate which do not generate first order diffraction images of said third beam;

sequentially illuminating those positions which do not generate a first order diffraction image of said third beam when said plate is illuminated by the interrogation word, with a coherent light beam of small cross-section;

detecting at least one of the groups of information stored at the position being illuminated.

* * * * *